US006435683B1

(12) United States Patent
Milner

(10) Patent No.: US 6,435,683 B1
(45) Date of Patent: Aug. 20, 2002

(54) OPTICAL COMPONENTS FOR DAYLIGHTING AND OTHER PURPOSES

(75) Inventor: Peter James Milner, Hinckley (GB)

(73) Assignee: Redbus Serraglaze Ltd. (GB)

( * ) Notice: Subject to any disclaimer, the term of this patent is extended or adjusted under 35 U.S.C. 154(b) by 0 days.

(21) Appl. No.: 09/787,567

(22) PCT Filed: Sep. 20, 1999

(86) PCT No.: PCT/GB99/03128

§ 371 (c)(1),
(2), (4) Date: Jun. 12, 2001

(87) PCT Pub. No.: WO00/17477

PCT Pub. Date: Mar. 30, 2000

(30) Foreign Application Priority Data

Sep. 18, 1998 (GB) ............................................ 9820318

(51) Int. Cl.[7] ................................................ G02B 27/00

(52) U.S. Cl. ....................... 359/608; 359/609; 359/613; 359/599

(58) Field of Search ................................ 359/608, 609, 359/613, 599, 600, 593, 594, 595, 514, 601, 602

(56) References Cited

U.S. PATENT DOCUMENTS

| | | | | | |
|---|---|---|---|---|---|
| 3,603,670 | A | * | 9/1971 | Kim | 350/365 |
| 3,712,713 | A | * | 1/1973 | Appledorn | 353/276 R |
| 4,773,733 | A | * | 9/1988 | Murphy, Jr. et al. | 350/260 |
| 5,247,390 | A | * | 9/1993 | Hed | 359/599 |

* cited by examiner

*Primary Examiner*—Mohammad Sikder
(74) *Attorney, Agent, or Firm*—Gifford, Krass, Groh, Sprinkle, Anderson & Citkowski, P.C.

(57) ABSTRACT

A low profile rearview mirror for a motor vehicle having a first refractor with a first refractive index and a first chromatic dispersive power. The first refractor is disposed in a housing on the exterior of the vehicle. A reflector mounted partially within the motor vehicle extends into the housing for the first refractor and the refractor is positioned to receive and reflect light from objects behind the vehicle passing through the first refractor. A second refractor having a second refractive index and a second chromatic dispersive power is mounted between the first refractor and the reflector and the first and second refractors have complementary properties of chromatic dispersion.

33 Claims, 14 Drawing Sheets

OPTICAL COMPONENTS FOR DAYLIGHTING AND OTHER PURPOSES

BACKGROUND OF THE INVENTION

1. Field of the Invention

The present invention relates generally to optical components for daylighting and other purposes.

2. Description of Related Art

The term "daylighting" as used in the specification will be understood to refer to applications in which natural daylight is allowed into buildings or other structures (such as vessels or aircraft) through openings provided with means by which the amount of usable light entering through the opening is enhanced by various means. This may be achieved, for example, by diverting light from incident angles at which they would not otherwise provide useful light within the building or other structure, or by capturing light passing the opening which would not otherwise enter the building through it.

A number of previous attempts have been made to improve the daylighting of buildings through transparent elements fitted in openings, such as doors and windows. It was appreciated at an early stage that the provision of a plurality of elementary prism-like structures on one side, or even on both sides, of a pane of glass would provide diversion of incident light utilising the known properties of a prism to refract the light. The benefit of such light-diverting properties lies in the fact that light incident on a window or glazed door from the outside is of greater intensity at high angles of incidence (assuming that the glazing element is planar, lies in a substantially vertical plane, and angles of incidence are measured from the normal or horizontal plane) which means that with traditional plane glazing elements the strongest light arriving from the highest angles passes straight through to illuminate a limited region on the floor of the interior of the building closest to the window, whereas regions further into the room, although they receive light arriving at shallower angles of incidence, are not so strongly illuminated. It is a well-recognised phenomenon that in large rooms lit by a single window in one wall, the level of daylight illumination nearer the back wall and further from the window is less, and frequently considerably less, than the illumination closer to the window.

So-called "daylighting" glazing elements have sought to rectify this situation by diverting light arriving at high angles of incidence, by refraction as it passes through the glazing element, so that the exit angle of at least some of the light arriving from an incident angle above the horizontal is itself above the horizontal so that this light is directed upwards and towards the back of the room instead of being directed downwards to the floor.

Previous attempts to provide daylighting glazing, however, have suffered from the fact that the light-diverting optical properties of the glazing elements have resulted in diffusion of the light into a range of different directions so that an observer within a room has no view through it because light arriving at his eye comes from a wide range of different directions. For this reason, although the daylighting principle is desirable the prior art systems have effectively closed the room from the outside which is a considerable disadvantage from the point of view of the occupants, reducing the daylight to little more than the equivalent of artificial light even though it may have the desirable properties of day light in term of spectral range and colour temperature.

In recognition of this problem a number of element profiles have been developed which are capable, when used in the vertical orientation of traditional glazing, that is with panels lying in a substantially vertical plane, of diverting light incident at high angles above the horizontal and allowing light incident at shallow angles close to the horizontal (both above and below it) to pass through substantially undeviated whereby the occupants of a room can obtain a view through the glazing elements to the outside whilst the high intensity light arriving from high in the sky is diverted towards the back of the room to improve the level of illumination.

The applicant's own earlier International Applications Nos. PCT/GB94/00949 and PCT/GB97/00517 describe various different profiles using both individual elements and components comprising composite structures, for achieving this desirable effect. One of the profiles utilised comprises what amounts to a parallel series of shaped grooves in one face of an element which, in use, is orientated with the grooves horizontal. The size of the grooves is such that they do not exceed the average pupil diameter of the human eye, but are not so small that diffraction effects predominate, so that the eye effectively integrates the optical effects making it possible to see through the element without significant distortion or interruption of the image.

Of course other applications of the optical component of the present invention are not excluded, and its description with reference to daylighting purposes is to be understood as being without prejudice to the generality of the invention. In particular, the optical component of the present invention may be utilised as a cover for a light source where it may be desired to divert light generated thereby or for any of a range of other applications in which optical components may be used, such as in the illumination of screens (both those bearing images and those acting as barriers) transmission of images and/or illumination of advertising signs, shop windows or the like. When diverting light by the use of refraction and/or reflection one problem which continually arises is that of chromatic dispersion which can be of significance especially if the diverted light is to be used for imaging purposes. Another problem arising with daylighting elements generally, is the possibility of glare arising from, for example, the region immediately around the sun, which is usually out of the normal line of vision but which, because of the diversion of incident light, may have an apparent direction which impinged detrimentally on the field of view of occupants within the building. Brightness variations from day-to-day can also mean that a daylighting system which works well for average conditions is inadequate in dull or overcast conditions and excessively or uncomfortably bright in clear-sky conditions.

SUMMARY OF THE INVENTION

The present invention seeks to provide means by which these disadvantages of daylighting systems can be mitigated at least to some extent, and to provide configurations of daylighting elements and components which will improve the performance of daylighting systems generally and extend the range of applications to which they can be put. The present invention also seeks to introduce further ideas and concepts about how optical elements can be adapted to enhance the internal illumination of buildings.

According to one aspect of the present invention, therefore, an optical element of the type comprising two optically transparent bodies each having two major faces one of which is interrupted by a plurality of cavities separating the said major face into a plurality of first elementary surfaces, between the cavities there being cavity separators defined by second elementary surfaces at which light incident through the corresponding optically transparent body above a certain threshold angle is reflected by total internal reflection and below which threshold it is transmitted and refracted, in which the shape of the cavities of the two bodies is complementary and such that the cavity separators between the cavities of one optically transparent body and the cavities of the other optically transparent body interpenetrate one another such as to define, for each cavity, at least two voids between facing elementary surfaces at which total internal reflection takes place.

In embodiments of the present invention the interpenetrated bodies may be in the form of substantially flat panels positioned face-to-face and these bodies may be sufficiently rigid to be self-supporting, or may be formed as thin films to be carried on other transparent supports such as the plane glass of conventional window glazing.

Earlier optical components involving two interpenetrating bodies have been so shaped that there is only one void defined by each pair of interpenetrating cavity and cavity separator. The present invention thus provides twice as many potential reflector sites for a given cavity structure as the prior art.

The present invention also comprehends an optical component as defined above in which the cavities are defined by elementary surfaces and at least two of the elementary surfaces defining a cavity are substantially parallel to one another, the distance between two such parallel elementary surfaces through a cavity separator being less than the corresponding distance within a cavity where by to allow inter penetration of cavity separators and cavities and formation of the said two voids per cavity.

The elementary surfaces defining a given cavity may be inclined with respect to a normal to the major faces of the component or may be parallel to such normal. In the former case the inclination may be alternately in opposite directions such that each cavity is slightly tapered towards the interior of the body (that is the cavity is slightly flared) which if the optically transparent body is produced by moulding aids mould release and furthermore assists interpenetration upon assembly of the two bodies to form the component.

In a preferred embodiment of the invention the elementary surfaces delimiting each cavity define both side walls and bottom walls of the cavity, and in this case it is preferred that the said at least one major face of the optically transparent body is separated by the cavities into first elementary surfaces which have a form and inclination matching that of the said bottom walls whereby to mate closely therewith when the two bodies are placed together with their cavities and cavity separators interpenetrating.

The profile shapes of the two bodies, that is the cross-sectional shape of the cavities and cavity separators may be identical. In such a case the bodies may be made with the use of a single mould and simply inverted with respect to one another in order to position them for interpenetration of their cavities and cavity separators.

The cavities may be of any form in which surface elements (preferably but not necessarily planar surface elements) define appropriate regular or irregular polygonal outlines. For example, the cavities may be triangular, square or hexagonal in plan form with the cavity separators being correspondingly shaped. In a preferred embodiment, however, the cavities are in the form of elongate grooves and the cavity separators are in the form of elongate ribs. The elementary surfaces defining the side and/or bottom walls of a cavity may be so shaped as to reduce or eliminate the incidence of light approaching at certain angles. This may be achieved, for example, by the shape of the cavity side and/or bottom walls. This shape may, for example, be such that the voids formed bet ween the walls upon interpenetration of the two bodies taper to a point in cross-section (that is a line in three dimensions in the case of elongate grooves) which result in light incident at a particular angle not reflected at the interface defined by the side walls is suppressed and prevented from passing through to form light beams in unwanted directions.

Preferably at least part of at least some of the cavity side and/or bottom walls are surface treated and/or coated whereby to inhibit the transmission of light through the component from a limited range of incident angles.

Embodiments of the present invention may be formed in which at least some of the surface elements defining the side and/or bottom wall of the cavities contact one another when the bodies are positioned interpenetrating one another, in such cases there may further be provided a transparent or translucent interstitial material having a refractive index not less than that of the body on the incident side of the interface thus defined and not greater than that of the body on the exit side of the interface thus defined. This, of course, implies that the two bodies have a different refractive index from one another although the case in which both bodies have the same refractive index and the interstitial material has the same refractive index as the bodies is not excluded.

Conveniently the transparent or translucent interstitial material may be an adhesive. Such a configuration ensures that light contacting the interface at or near grazing incidence, which can occur at inclined interfaces in optical components of the type defines herein, is not reflected.

The choice of orientation angle of the interface and the interstitial materials in particular the refractive index of the material, allows control to be exerted at the design stage on the angle of incidence of light, with respect to the major faces of the component, at which occurs the transition from reflection through the interface to reflection at it. This design choice allows the designer to prevent the transmission of unwanted light from a certain range of elevation angles while permitting the transmission of light from other angles. This may typically be exploited as a sun shading function which operates over only a small range of elevation angles, for example centred on the average position of the sun. In such a way the view through the component, an important factor in all the embodiments of the present invention, is suppressed at or near the elevation of the sun whilst normal viewing through the element is afforded in all other directions. This can be achieved, of course, without detriment to the interior illumination and particularly the enhancement in what would be provided by alternative shading means such as conventional blinds.

The present invention thus comprehends an optical component of the type comprising optically transparent bodies having major faces at least one of which is interrupted by a plurality of cavities with cavity separators between them, formed as a sun shade or barrier to prevent the transmission of light through the component from certain incident angles or ranges of angles. This can be achieved by a combination of the choice of orientation angle of an interface and refractive index of interstitial material between the surfaces defining the interface whereby to determine the angle of incidence at which the transition from refraction through the interface to refraction therefrom occurs.

In order to control chromatic dispersion the optical component of the present invention is provided with interfaces within a limited range of angles. In particular the angle of inclination of those surface elements of the bodies which define interfaces at which reflection takes place preferably lie at an angle to the normal to the major face of the body which does not exceed 7°. In fact, it is more preferable for the angle of such interfaces to be limited to not more than 5°. Embodiments of the present invention may also be provided in which the surface elements are configured to allow the use of the component as a mirror.

The above discussion is based on the assumption that the optical elements forming the two bodies from which the component is assembled, lie with their major faces parallel to the plane of an opening. Other embodiments, incorporating components which do not span the entirety of an opening, are possible as will be discussed below. In one such arrangement an optical assembly including optical components as defined hereinabove, in which the transparent bodies are sufficiently rigid as to be self-supporting or are carried on a or a respective transparent or translucent support, is so formed that the bodies and/or the supports are elongate and held in an array substantially parallel to one another. In one embodiment such an array is comparable in configuration as to that of a Venetian blind with the slats lying horizontally or vertically.

If the cavities in the transparent bodies are elongate grooves these may lie either parallel to the length of the slats or perpendicular thereto, or may be inclined with respect to their length. Likewise, the slats themselves may be inclined with respect to the horizontal (in order to lie as closely as possible to the path of the sun) and the slats may be fixed or adjustable in inclination about an axis parallel to the lengths of the slats. Such adjustment may be effected manually or there may be provided means for automatically adjusting the inclination of the slats about their respective longitudinal axis in dependence on a signal from a light sensor representing the incident direction of the major part of the incident light.

The present invention also comprehends an array of elongate bodies and/or supports in the form of a substantially planar array pivotally mounted or mountable outside an opening in a building or the like in such a way that the array can turn as a whole about a pivot axis parallel to one edge thereof. In configurations such as that described above, in which the bodies or supports are in the form of slats of a venetian blind, these may or may not be individually turnable about their own respective longitudinal axis.

The array of elongate bodies and/or supports may be mounted or mountable outside an opening in the building or the like without being turnable about one edge, but with the plane of the array being inclined with respect to the plane of the opening whereby to intercept light travelling downwardly past the opening, the reflecting interfaces of the optical components being oriented such as to divert this downwardly-directed light through the opening.

The present invention also comprehends an optical assembly comprising at least one optical component of the type comprising two optically transparent bodies each having two major faces at least one of which is interrupted by a plurality of cavities with cavity separators between them, the two bodies being positioned with their said one major faces in contact and the cavities and cavity separators interpenetrating one another to form a plurality of closed voids, in the form of a panel having means for supporting the panel over the outside of a window or other opening in a building or the like with its plane inclined to the vertical whereby to divert into the opening light travelling downwardly past the opening. Such a panel may be mounted in such a way that its inclination is adjustable.

The present invention also comprehends an optical assembly comprising at least one optical component as herein defined, in the form of a glazing panel in or over a window or like opening in a building, together with a further light-diverting component within the interior of the building and positioned in the path of light diverted by the said optical component and acting to divert the light incident on it. The said further light-diverting component may be a curved or plane reflector. In the former case the curvature may be cylindrical or spherical.

In any daylighting system of the present invention there may also be provided an additional artificial light source and means for positioning the source outside an opening in a building and orienting it in such a way as to direct light towards the opening. In an assembly of this type the light-diverting optical component may be so designed that light projected by the artificial light source is diverted by the optical component in a predetermined direction or range of directions. The present invention also encompasses an optical component of the type comprising two optically transparent bodies each having two major faces one of which is interrupted by a plurality of cavities separated by cavity separators, positioned in face-to-face relation with the cavities and cavity separators of the two bodies interpenetrating one another, with an air gap between them, in which the cavities and cavity separators are so shaped as to define in the assembled component substantially catadioptric reflectors at least for light incident over a certain range of incident angles.

In one embodiment the said one major face of each body is interrupted by elongate grooves defined by inclined planar faces. In such an embodiment the two inclined planar faces defining the grooves are preferably inclined at substantially 90° to one another.

An optical assembly comprising a set of optical components having catadioptric reflectors as discussed above may be formed with the components as elongate strips or slats the inclination of which about an axis parallel to their length is adjustable.

Another function which can be fulfilled by optical components formed in accordance with the present invention is that of limiting the direction of transmission of light incident over a range of directions. This may be of value, for example, if the optical component is a screen over a light source or, for example an instrument panel or the like in preventing unwanted transmission of light in certain directions.

Typically a screen over an instrument panel may limit the transmission of light to a narrow band of angles to either side of a normal so that only a user positioned directly in front of the instrument can read it and observers to the side of the instrument, outside the range of transmission angles, receive no light and therefore no image. The restrictions on transmitted light may also of course apply to reflected light so that embodiments of the invention may be used to reduce unwanted reflections (particularly at night), or to reduce glare or improve display contrast. This may be of value in a wide range of applications where a user may wish to observe an instrument panel, such as a motor vehicle or aircraft instrument panel, without disturbing reflections from nearby light sources.

According to another aspect of the present invention, therefore, there is provided an optical component of the type comprising two or more optically transparent bodies each having two opposite major faces one of which is interrupted by a plurality of cavities, defined by elementary surfaces, with cavity separators between them, in which the two bodies are engaged in face-to-face relationship with their said one faces in contact such that the cavity separators of one body penetrate into the cavities of the other, the shape of the cavities being such that at least one elementary surface thereof is not contacted by the corresponding elementary surface of the cavity separator of the other body when the two bodies are fully engaged whereby to form a void between them, the void containing a non-transparent material.

The said one elementary surfaces defining the voids may be of a variety of shape and configuration. In a first embodiment the said one elementary surfaces are flat at least over the major part of their area and lie substantially orthogonal to the said major face of the optically transparent body. In such an embodiment incident light normal to the component is transmitted through it substantially undeviated, as is light incident at a range of angles from the normal up to a certain threshold angle determined by the ratio between the spacing of the cavities and their depth. Light incident at greater angles is absorbed at the interfaces between the material of the bodies and the non-transparent material in the cavities.

A preferential direction of transmission can be provided if the said one elementary surfaces forming the voids lie at an angle to the normal such that the range of incident angles transmitted through the component is inclined as a whole to the normal. This may be relevant, for example, for use as cover panel to an instrument which is located some distance to one side of an observer.

The nature of the non-transparent material in the voids may be chosen to achieve a desired effect. By selecting a material having a refractive index less than that of the bodies, and by using as the non-transparent material one which is translucent or at least not entirely opaque, it is possible to have at least part of the incident light at certain angles reflected, as well as some of the light incident at other angles being absorbed whilst incident light within the said transmission range of incident angles is transmitted. Such an embodiment may be used for interior lighting as well as for displays, or for daylighting purposes where glare at certain incident angles is a problem which can be overcome by absorbing the incident light at those angles.

The practical construction of such embodiments of the invention may be achieved in a number of ways. For example a non-transparent adhesive may be coated on to one or both facing major surfaces of the two bodies before they are brought together. By applying a sufficiently great pressure to the two bodies the adhesive between the elementary surfaces of the cavities and cavity separators which are in direct contact with one another is effectively squeezed out so that these faces are not spaced by a film of adhesive. The adhesive squeezed out from between the contacting elementary surfaces fills the voids between the said one (non-contacting) elementary surfaces to form, in the finished product, an array of elementary opaque elements acting to absorb light incident thereon.

BRIEF DESCRIPTION OF THE DRAWINGS

Various embodiments of the present invention will now be more particularly described, by way of example, with reference to the accompanying drawings, in which.

DETAILED DESCRIPTION OF PREFERRED EMBODIMENTS

Figures 1, 2:
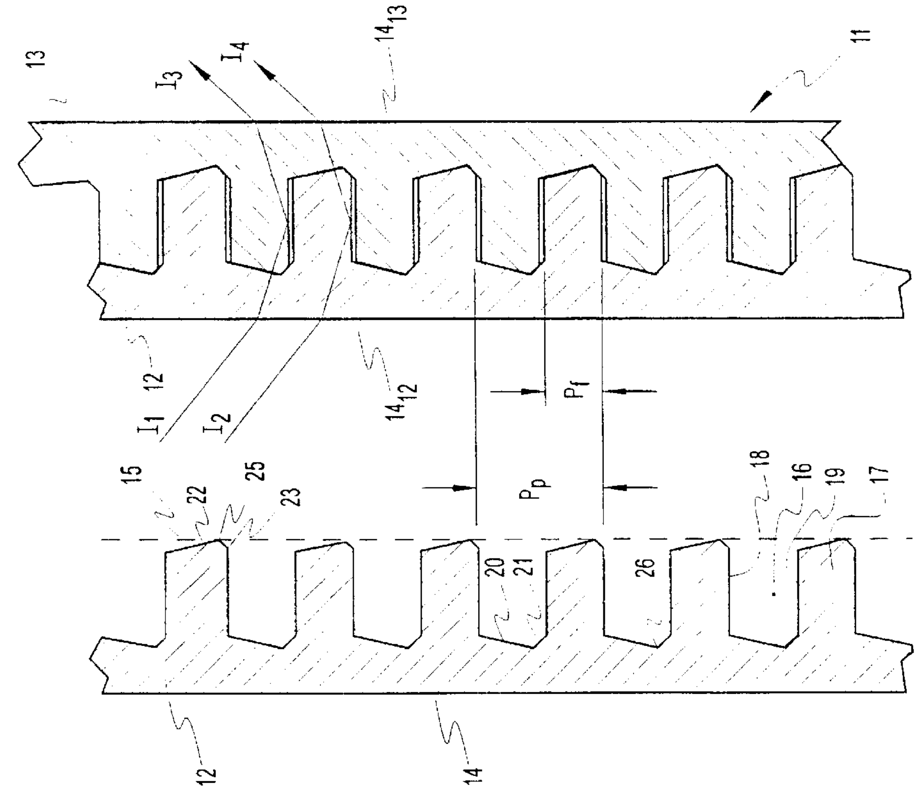
FIG. 1 is a cross-sectional view, on an enlarged scale, of a transparent body suitable for forming an optical component of the present/invention.
FIG. 2 is a cross-sectional view, on an enlarged scale, of a part of an optic component formed utilising the body of FIG. 1.
Figure 3:
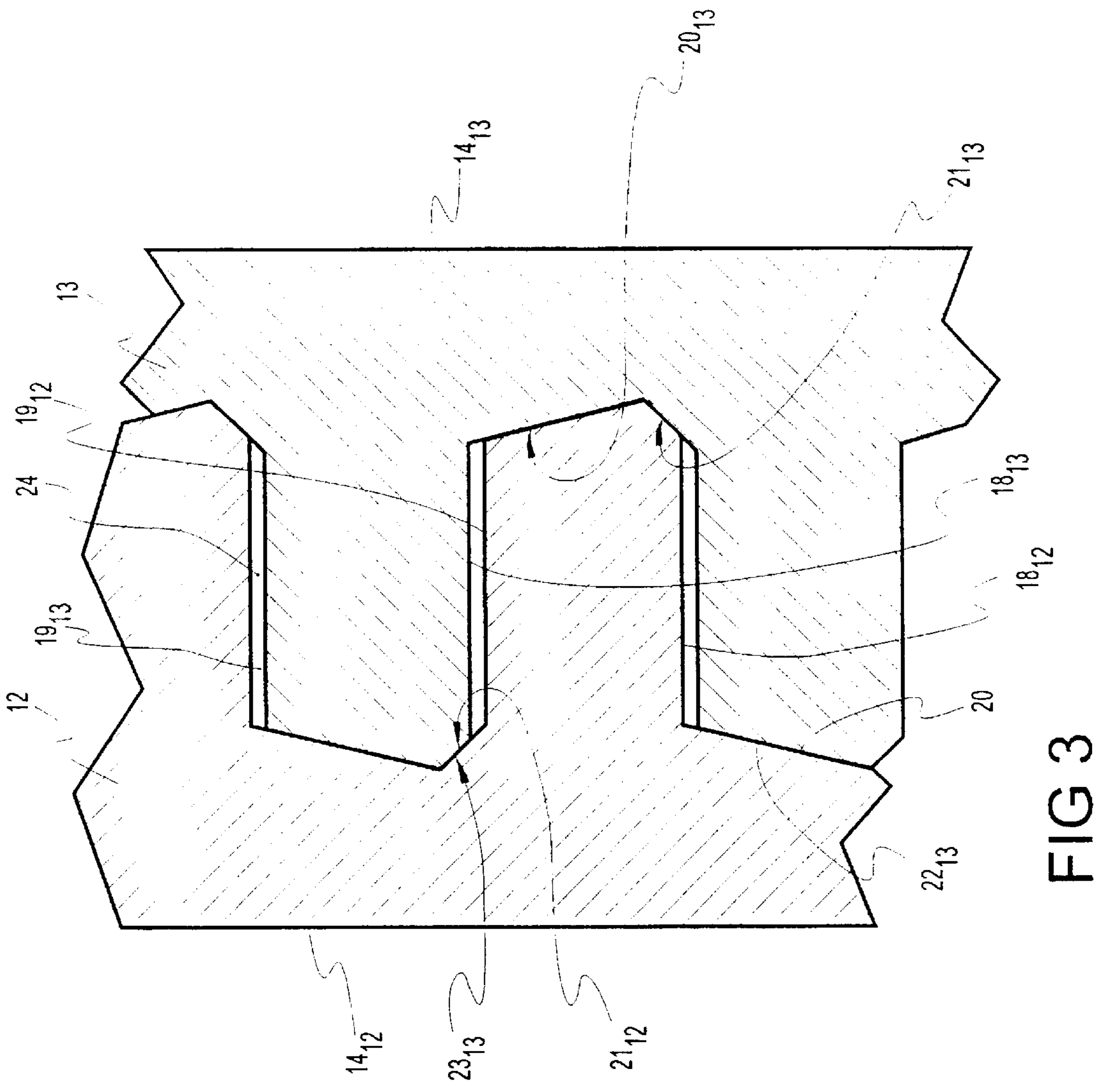
FIG. 3 is a greatly enlarged cross-sectional view of a detail o FIG. 2.

Referring now to the drawings, and particularly to FIGS. 1 to 3, there is shown an optical component generally indicated 11 which comprises two bodies 12, 13 which, in this embodiment, are identical to one another. The body 12 is shown in FIG. 1 which illustrates a cross-section, on an enlarged scale, through a part of the body 12 which may be considered as a flat panel having a first major face 14 which is flat an uninterrupted, and a second major face, represented by the broken line 15, which is interrupted by a plurality of cavities 16.

It will be appreciated that, for the sake of clarity of illustration, the relative proportions, in particular in relation to the thickness of the material and the depth of the cavities 16, have not been shown to scale and in practice may differ significantly from the proportions illustrated. Moreover, it is anticipated that the overall thickness of the material, that is the separation between the two major faces 14, 15, may be of the order of no more than a few millimetres, and preferably slightly less than 1 mm, and the pitch (identified by the reference $P_p$ in FIG. 2) is of a maximum dimension of the order of diameter of the pupil of the human eye (about 1 mm) and may be significantly smaller, namely down to the size at which diffraction effects start to predominate (several $\mu$m).

Moreover, in this embodiment, the cavities 16 are in the form of elongate grooves running parallel to one another in the major face 15 although in other embodiments (not illustrated) the cavities may be of other forms. Separating the cavities 16 are respective cavity separators 17 which, in this embodiment, are constituted effectively by elongate ribs. Each cavity 16, as shown in FIG. 1, is defined by two parallel side walls 18, 19 and the bottom of each cavity is defined by two inclined bottom walls 20, 21 the former of which is inclined at a shallow angle to the major face 14 and occupies the major part of the bottom of the cavity 16, with the wall 21 being more sharply inclined (about 45°) and provided for a purpose which will be described in more detail below.

The entrance to each cavity 16 is defined by two inclined entrance walls 22, 23 the inclinations of which are equal in magnitude and opposite in direction to those of the bottom walls 20, 21. Indeed, the walls 22, 23 which can be described as defining a flared entrance to the cavity 16 also define the end or nose portion of the cavity separator 17 between adjacent cavities 16. The width, parallel to the major face 15 of each cavity 16 is slightly greater than the corresponding width of the ribs defining the cavity separators 17. Thus, as can be seen in FIG. 2, when two transparent bodies having the form illustrated in FIG. 1 are placed with their major faces towards one another in face-to-face relationship their respective cavity separators 17 penetrate into corresponding cavities 16 to form a composite body 11 as illustrated in FIG. 2 and, on a larger scale, in FIG. 3. In these two figures the elementary surfaces identified in FIG. 1, and belonging to the transparent body 12 or the transparent body 13 have been identified with the same reference numerals as used in FIG. 1, with a subscript $_{12}$ or subscript $_{13}$ as appropriate.

Thus, when the cavity separators 17 of the body 13 enter the cavities 16 of the body 12 and, correspondingly, the cavity separators 17 of the body 12 enter the cavities 16 of the body 13, the narrower width of the cavity separators 17 in relation to the width of the cavities 16 leaves voids 24 between adjacent pairs of side walls 18, 19. These voids 24 form two separate sets, namely those defined between the side walls $\mathbf{18}_{12}$ of the body 12 and the wall $\mathbf{19}_{13}$ of the body 13 and those formed between the wall $\mathbf{19}_{12}$ of the body 12 and $\mathbf{18}_{13}$ of the body 13. These voids arise alternately along the array of voids defined by the interpenetrating cavities and cavity separators.

The inclined surfaces 22, 23 defining the nose portion of each cavity separator 17 match and mate with the correspondingly inclined bottom wall surfaces 20, 21 of the cavity 16. The line of intersection between the inclined nose surfaces 22, 23, which has been identified 25 in FIG. 1, is thus held in register with the line of intersection 26 between the inclined bottom walls 20, 31. This helps to ensure that the two bodies are located in a predetermined registered position with the widths of the voids 24 all being substantially the same.

As can be seen from FIG. 2, light rays I1, I2 incident on the major face $\mathbf{14}_{12}$ of the optical component 11 are refracted at this face with the former passing, undeviated, across the interface defined by the inclined surfaces $\mathbf{20}_{12}$ and $\mathbf{22}_{13}$ to be reflected at the interface defined by the side wall surface $\mathbf{18}_{13}$ with the void 24. The light continues to the major face $\mathbf{14}_{13}$ of the body 13 where it is refracted again to an exit direction represented by the arrow head. The light ray I2 arriving in the same direction as the light ray I1 but offset by the void pitch $P_F$ is refracted at the major face $\mathbf{14}_{12}$ through the same angle, and arrives at the interface between the void 24 and the side wall surface $\mathbf{18}_{12}$ after having passed through the body 12. At this point it is reflected through the same angle as the light ray I1 and, again, refracted at the major face $\mathbf{14}_{13}$ to exit in the same direction. This embodiment provides means by which an array of parallel reflectors can be provided at half the pitch $P_p$ of the cavity profile thereby making it possible to have a closer reflector pitch spacing than has hithertofore been achieved with structures in which only one surface of the cavity effectively forms the reflecting interface.

Figures 4, 5:
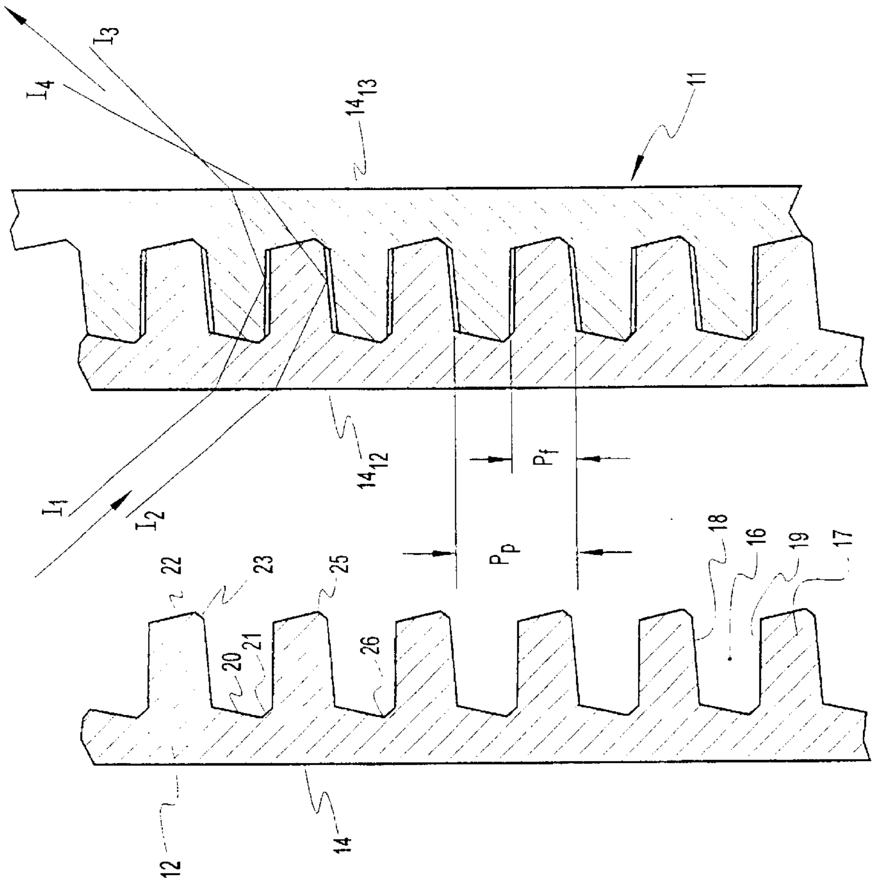
FIG. 4 is a cross-sectional view of a part of a body suitable for forming an optical component constituting a second embodiment of the present invention.
FIG. 5 is a cross-section through an optical component formed utilising the body of FIG. 4.
Figure 6:
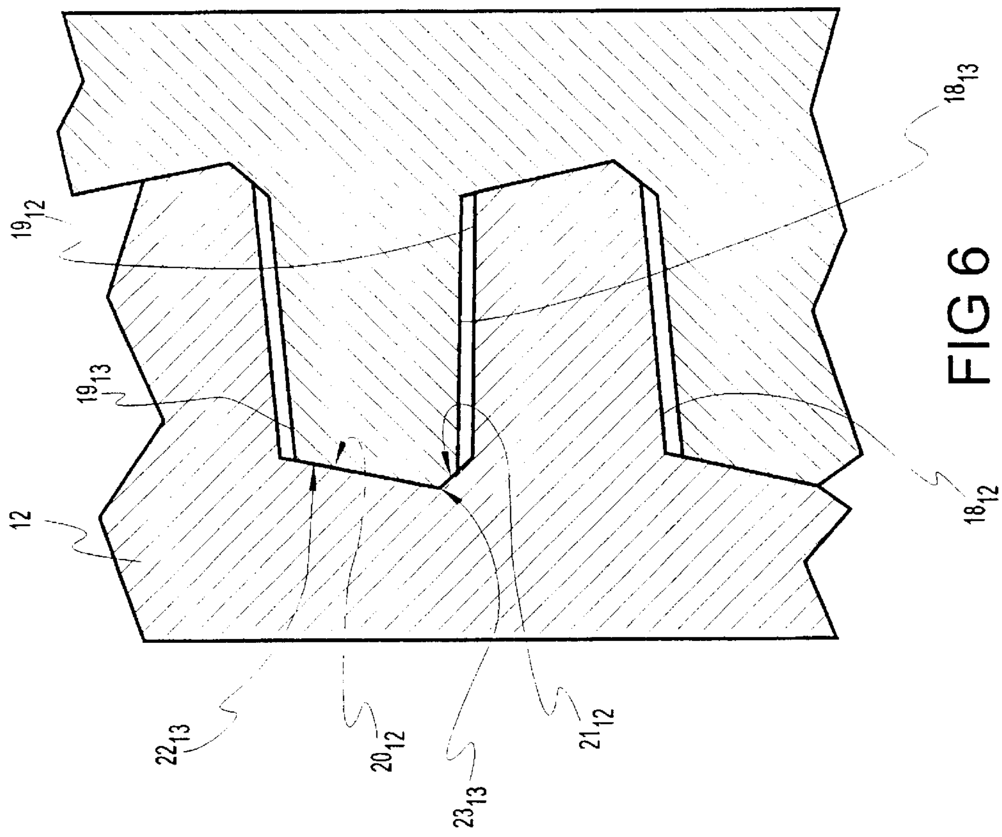
FIG. 6 is a greatly enlarged view of a detail of FIG. 5.

FIGS. 4, 5 and 6 show a similar embodiment in which the same reference numerals are used to identify the same or similar parts. In this embodiment, however, the side walls 18, 19 of the cavity 16 are slightly divergent outwardly. This allows the profile body 12 to be produced by casting, the inclination of the side walls 18, 19 effectively forming a so-called "draft" angle facilitating release of the mould from the moulded product. As a corollary, because the voids 24 are not therefore parallel to one another, the reflection of two different but parallel incident beams $I_1$, $I_2$ results, as shown in FIG. 5, in two exit beams I3, I4 which are not parallel to one another as are the corresponding beams in FIG. 2. This inclination, however, does not seriously detract from the performance of the optical component merely resulting in the reflected light being spread over a slightly larger area. The important view-through property of the component, allowing an observer to receive light substantially undeviated over a range of angles centred on the normal to the major face 14 is preserved with the voids occupying only a slightly greater part of the field of view in this embodiment over that of FIGS. 1 to 3.

Figure 7:
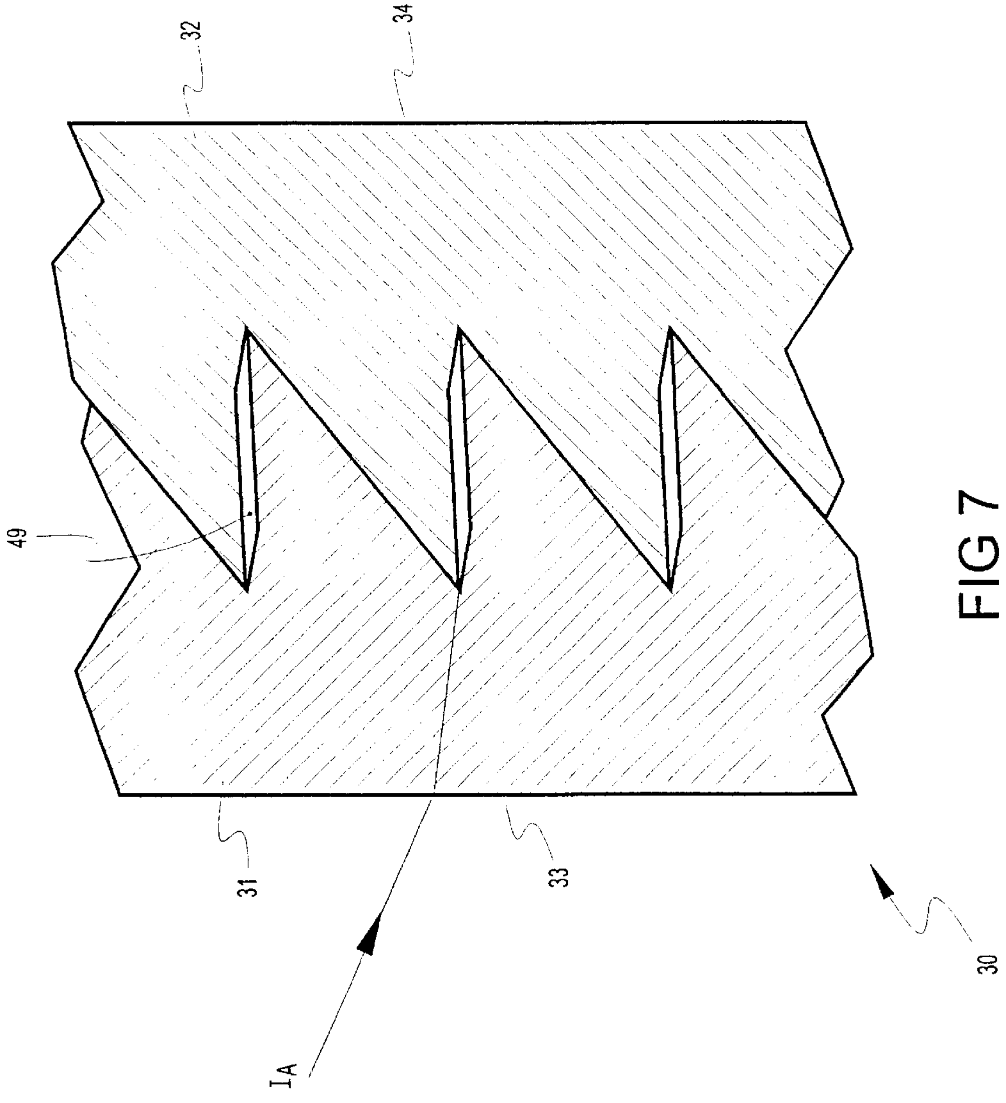
FIG.7 is an enlarged cross-sectional view of a part of an optical component constituting a third embodiment of the present invention.
Figure 7B:
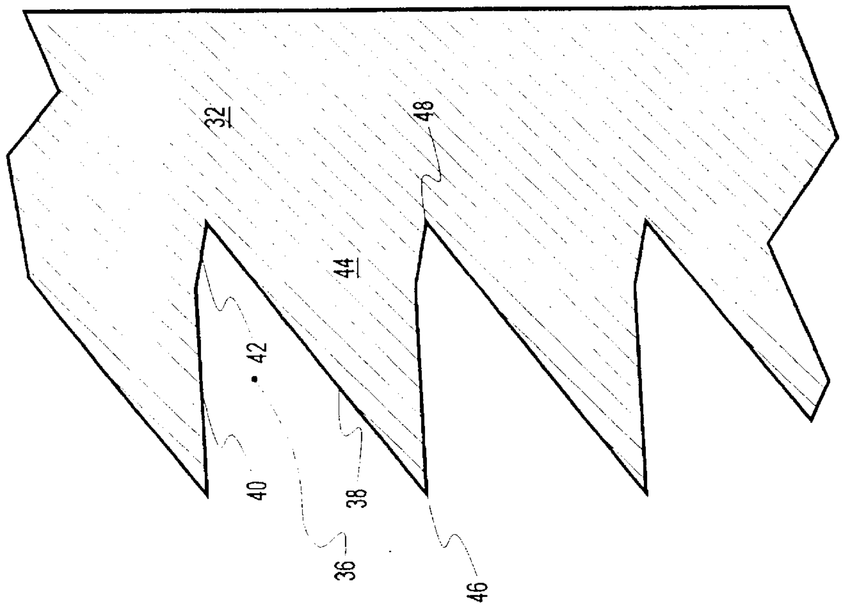
Figure 7A:
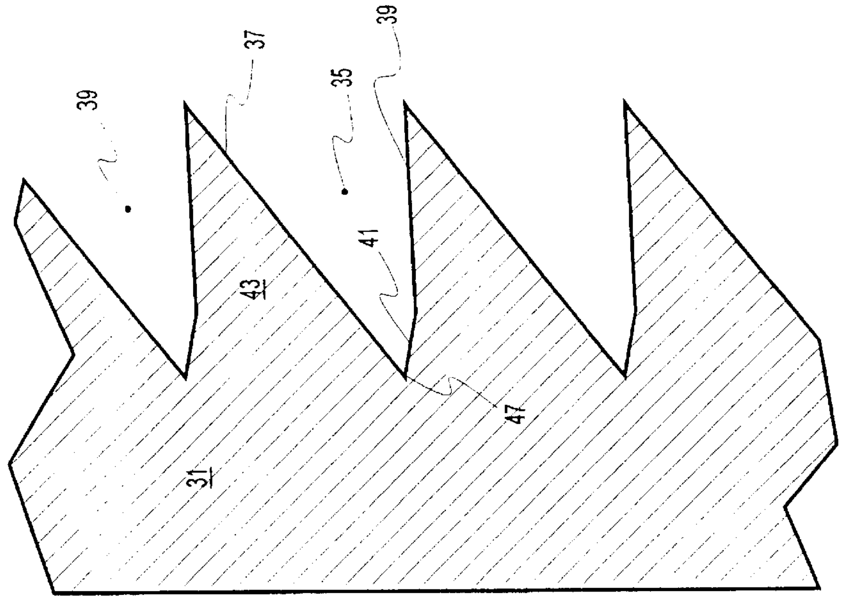
Figure 8:
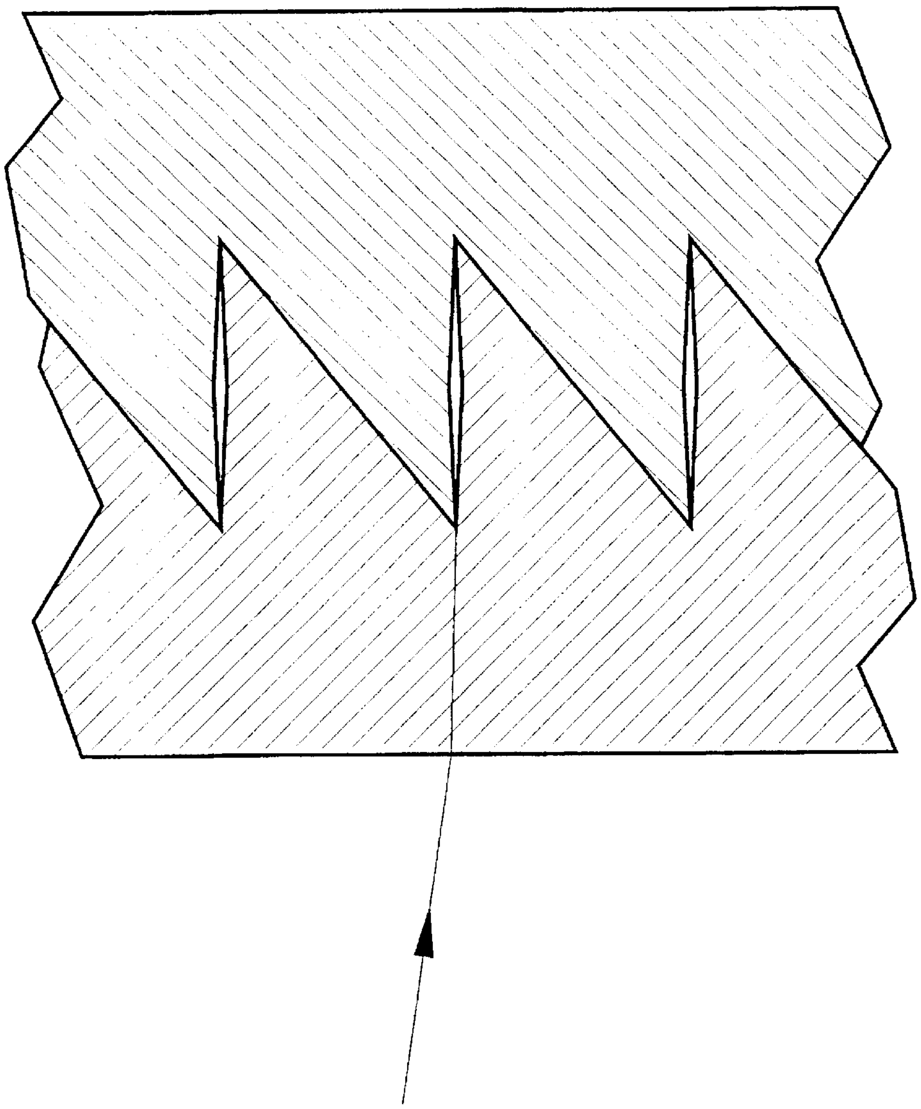
FIG. 8 is a cross-sectional enlarged view of a component forming a fourth embodiment of the present invention.

Referring now to FIG. 7, this shows an alternative embodiment comprising two optically transparent bodies 31, 32 each having a respective major face 33, 34 and an opposite major race interrupted by a plurality of generally V-shape grooves 35, 36 which, as can be seen in FIGS. 7*a* and 7*b*, are defined by respective side walls 37, 39 and 41 in the case of the body 31, and 38, 40, 42 in the case of the body 32. Between adjacent cavities 35, 36 are respective cavity separators 43, 44. The inclined side walls 37, 39 meet at a point 45 whilst the inclined side walls 38, 40 meet at a point 46. Side walls 39, 41 are inclined at a slight angle from one another, and the side wall 41 meets opposite side wall 37 at a point 47 whilst, correspondingly, side walls 38 and 42 meet at a point 48. As will be seen, when the two bodies 31, 32 are placed face-to-face with their cavities and cavity separators interpenetrating one another, the side walls 37 of the body 31 contact the side walls 38 of the body 32 and the tips 45 of the cavity separators 43 enter the cavities 36 and reach to the bottom of the cavity defined by the point 48. The voids within the component 30 defined by the two bodies 31, 32 are identified with the reference numeral 49, these being trapezoidal in shape and tapering at each end. This tapered form ensures that the amount of light incident at a particular angle, such as that illustrated by the light beam $I_A$ which falls on a facet other than the desired one is minimised. Light beam $I_A$ thus represents the limit of the beam of light which acts in this way. Light at lower angles of incidence may not behave as desired, being reflected at the interface defined by the side wall 41. By tapering the voids the amount of such light is suppressed thereby not passing through the component to form light beams in unwanted directions. FIG. 8 shows a different form of the voids which achieves the same effect.

In all of the embodiments described above there is a proportion of incident light which can pass straight through the optical component to provide an observer with a view of objects on the far side of the component in substantially undistorted form. Because of the reflective effects, however, it is possible in some circumstances for light transmitted directly through the component to arrive at the observer's eye in substantially the same direction as light which has been reflected through a significant angle. This gives rise to anomalous or unusual images and is particularly obtrusive if the unusual image is that of the sun reflected through the optical component arriving in the same direction as light directed straight through the component from a substantially horizontal view point.

This can give rise to unwanted glare which can be disturbing to an observer even when not looking directly at the optical component, especially if the component is used for daylighting a building. This may be overcome or at least mitigated, by ensuring that at least some of the elementary surfaces of the component are rendered non-transparent over at least a part of the area thereof whereby to inhibit the transmission of reflective light over a certain range of angles.

The elementary surfaces may be rendered non-transparent in a number of ways. In one embodiment, for example, the elementary surfaces are subject to a surface treatment for this purpose. The surface treatment of the elementary surfaces may be such that these act as diffusing surfaces to light incident thereon, which may be achieved, for example, by working the surfaces in such a way as to render them translucent, for example by roughening or otherwise degrading the flatness of the surface. Alternatively, the surface treatment may be such as to render the surfaces entirely opaque and this, likewise, may be achieved in a number of different ways, including the provision of a coating. It is to be appreciated that the surface treatment may affect the entirety of or only a limited part of the area of the treated elementary surfaces, and the elementary surfaces themselves may be only a minor component of the overall surface of the optical component.

If a surface coating is used, this may have a variable density over the area of the elementary surface whereby to vary the degree of departure from transparency. Alternatively, the density of the coating may vary from one elementary surface to another whereby to vary the optical characteristics of the optical component over its area.

Likewise, surface treatment of particular regions of the elementary surfaces may be undertaken in order to reduce the phenomenon of flare. It is known that such phenomenon arises or is "seeded", at regions of an optical component where two surfaces meet at an edge. To inhibit flare such edge regions of the faces may be worked physically or chemically to degrade the optical flatness of the surface, for example by surface roughening, and the sharpness of the edge may likewise be reduced either physically or chemically so that the intersection between the two surfaces is irregular.

Figure 11:
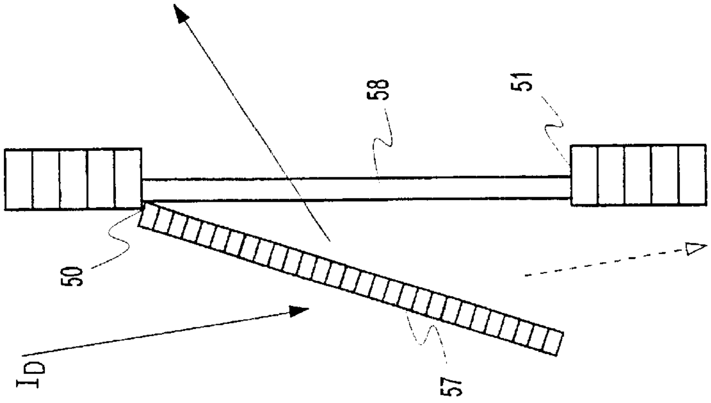
FIG. 11 is a schematic sectional view through a further assembly formed utilising an optical of the present invention.
Figure 9:
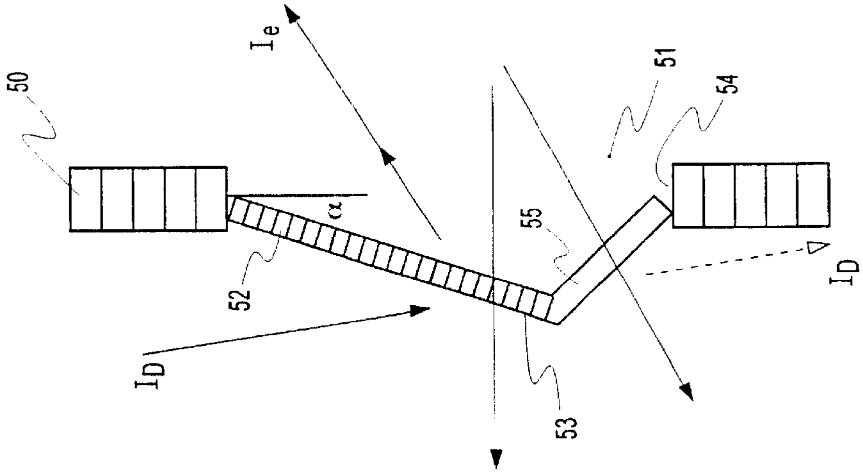
FIG. 9 is a schematic cross-sectional view of an optical assembly formed utilising an optical component of the present invention.

Turning now to FIG. 9 there is shown a wall 50 of a building (not otherwise illustrated) having an opening 51 such as a window opening in which is located a panel comprising an optical component such as that described in any of FIGS. 1 to 8 which is identified with the reference numeral 52 and which may be formed from transparent bodies which are sufficiently thick and of a material sufficiently stiff to be self-supporting, or formed as a film supported by one of its plane major faces on a supporting transparent sheet such as glass or perspex, or sandwiched between two such panes in the double-glazing configuration. The optical component 52 is not coplanar with the opening 51 but lies at an angle a with respect thereto and its lower edge 53 lies outwardly and above the lower edge 54 of the opening 51. The space between the lower edge 53 of the optical component 52 and the lower edge 54 of the opening 51 is filled with a plain glass panel 55. Triangular sides 56, illustrated in FIG. 10, may be made of glass or other transparent material, or may be made of a non transparent material. In this configuration light, represented by the beam $I_D$ which, as shown by the broken line $I_D$, would pass the opening 51 without entering it, can be diverted by reflection, as shown by the beam $I_R$, into the interior of the building (that is to the right of the wall 50) as viewed in FIG. 9. Such a structure, obviously, would have to be incorporated into the original design of the building. A similar effect can be achieved, however, as shown in FIG. 11 by suspending a panel 57 in front of the opening 51 which, in this case, is assumed to be glazed with a normal window or other transparent glazing 58. In this case the panel 57 may again be any of the optical components described above and its function is the same, namely to divert into the building light arriving from a high angle and which would otherwise pass the window opening 51 and be last. In this embodiment, however, by making the panel 57 pivotable about its upper edge 59 it is possible to adjust the inclination of the panel and thereby vary the light-collecting effect from a maximum, with the panel inclined to its greatest extent, to a minimum, with the panel lying substantially parallel to the pane 58.

Figure 10:
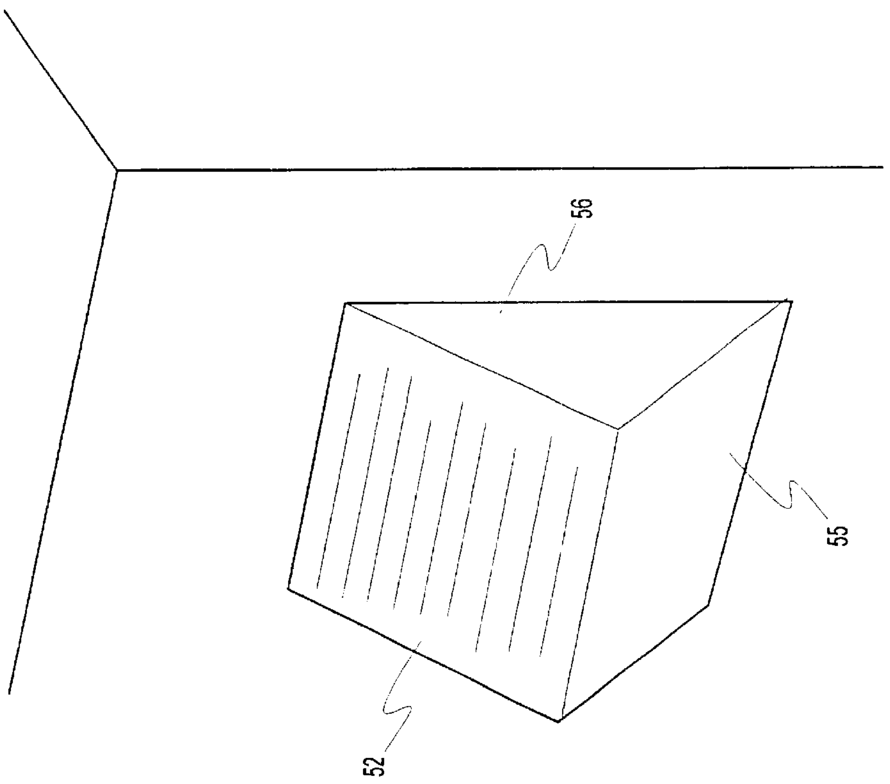
FIG. 10 is a perspective view illustrating the embodiment of FIG. 9.
Figure 12:
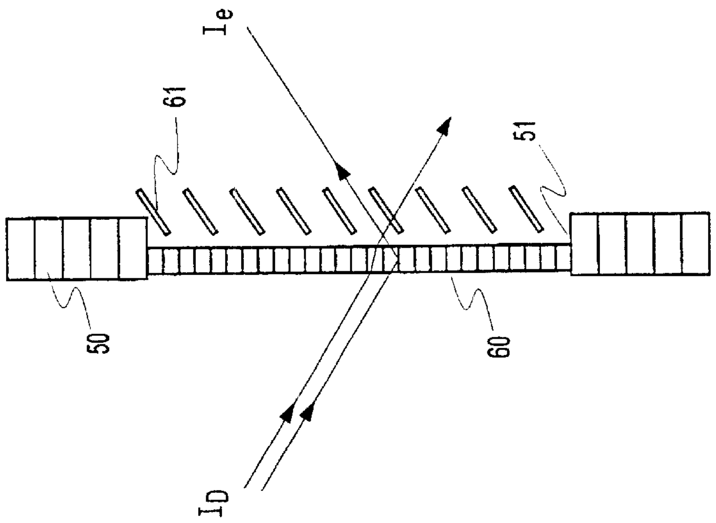
FIG. 12 is a schematic sectional view through an optical assembly formed utilising the optical component of the present invention with an additional conventional venetian blind

The embodiments of FIGS. 9, 10 and 11 are aimed at situations where it is desirable to collect the maximum amount of light for delivery into the interior of the building. There may, of course, be circumstances where the light is too bright, or light from certain angles is unwanted. FIG. 12 illustrates a window opening 51 in a wall 50 which is glazed with an optical panel 60 which, again, may be any of the optical components described above. At certain angles of incidence, therefore, light (typically the light represented by the light beams I in FIG. 12) is reflected such that the light passing through the optical components 60 is inclined upwardly as illustrated by the beam $I_R$. A proportion of the light from the direction I, however, will not be reflected and if it is desirable to suppress this, suppression can be achieved by the use of a venetian blind 61 of conventional type.

Figure 13:
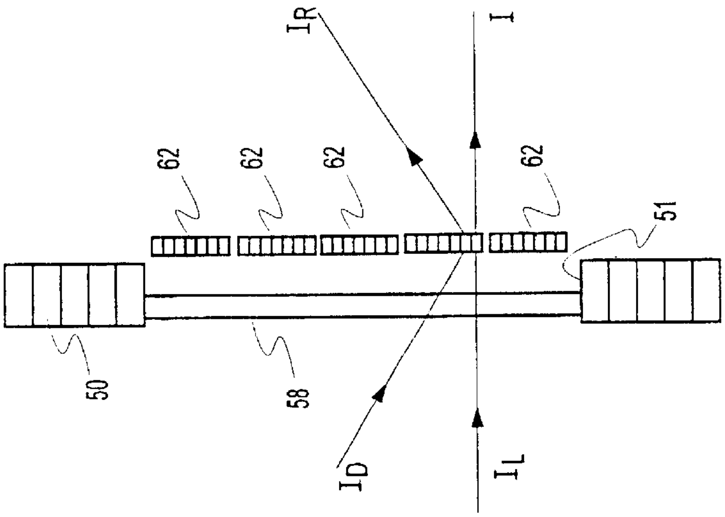
FIG. 13 is a schematic cross-sectional view of a window opening having conventional glazing and a secondary assembly formed utilising optical components of the present invention.

The disadvantage of the use of a venetian blind 61 is that the unwanted light is not allowed to enter the interior of the building and this reduces the level of illumination within the interior. It may be, however, that the light is unwanted because of its inclination, that is because it falls at an inconvenient angle either straight into the eyes of a person seated or standing at a particular position and facing in a general direction towards the window. Such light, typically, may be light directly arriving from a low sun where glare may be a problem. The overall illumination within the interior of the building, however, may not be so great as to warrant reducing it by the use of a venetian blind 61, and in such circumstances the embodiment of FIG. 13 may be of value. In this embodiment an opening 51 in a wall 50 is provided with a plain glass glazing panel 58 as in the embodiment of FIG. 11 but in this case over the interior of the opening 51 is located an assembly of optical components in the form of horizontal slats 62 each made of an optical component such as that described in any of the preceding embodiments. With such a configuration, by varying the inclination of the slat 62 about respective horizontal axis as is typically achieved for a venetian blind, the direction of light transmitted into a building may be varied without suppressing any so that a glare problem can be countered by light diversion rather than light suppression. This embodiment also allows straight-through view to be achieved unlike the venetian blind which obscures the view. This is illustrated in FIG. 13 by the incident light beam $I_D$ which, as in the embodiment of FIG. 12, results in the exit beam $I_R$ but now incident beam $I_L$ at a horizontal level is transmitted straight through to allow an observer to view the exterior of the building.

Figure 14:
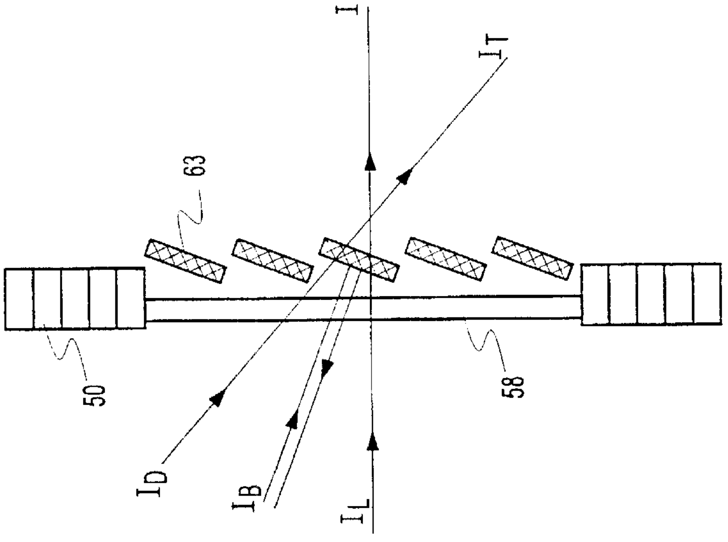
FIG. 14 is a view similar to that of FIG. 13 showing an alternative optical component in the assembly.

If a measure of light suppression is required as well as the ability to vary the incident light angle and maintain a view through the window an embodiment such as that illustrated in FIG. 14 may be employed. This, like the embodiment of FIG. 13, provides for a "venetian blind" array of slats 63 on the interior side of a window 58 in a wall 50. Here, however, the optical components of the slats 63 are formed such that light incident in a narrow range about the normal to the plane of each slat is retro-reflected as represented by the beam $I_B$, the "straight through" beam $I_L$ being unchanged and the downwardly inclined beam $I_D$ resulting in a transmitted beam $I_T$. A more detailed description of the optical component 63 is given hereinbelow with reference to FIGS. 17 to 20.

Figure 15:
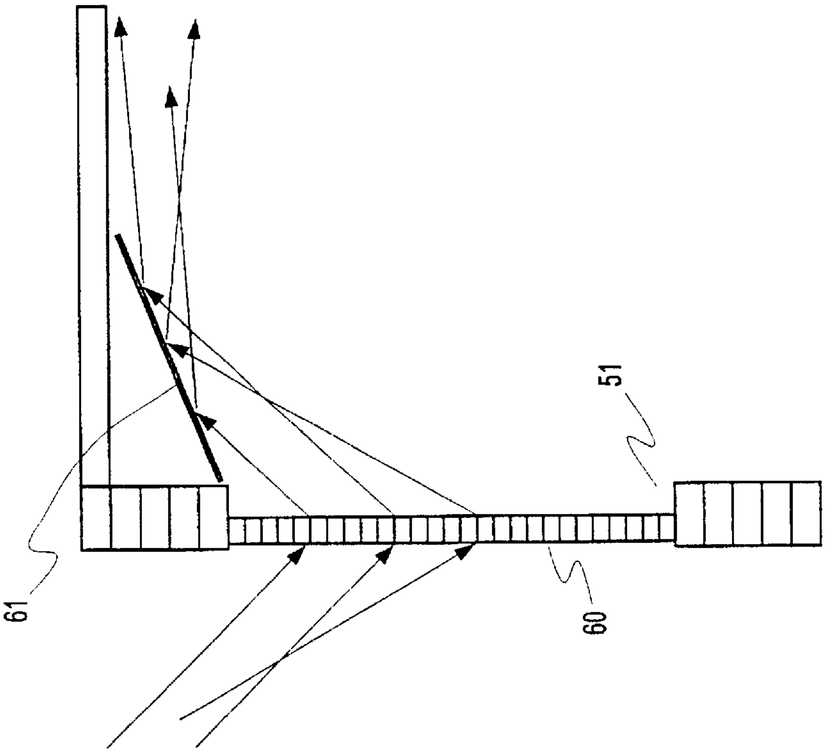
FIG. 15 is a schematic cross-sectional view illustrating a further optical assembly utilising the optical component of the present invention.

Turning now to FIG. 15, it has been established that in certain conditions, particularly with a bright sunny sky, the upwardly diverted light arriving at the ceiling close to the window in the interior of a building may be too bright. In the arrangement illustrated in FIG. 15 a reflector, in this case a plane mirror 60, is positioned above a window opening 51 glazed with an optical component 61 such as that in the embodiment of FIG. 12. As can be seen by the ray traces in FIG. 15 light arriving from high angles is reflected upwardly in to the room and diverted at its incidence with the reflector 61 into a direction generally parallel with the ceiling towards the interior of the room. In other embodiments (not shown) a divertor in transmissive (refractive) from may be provided in place of the reflector, and the reflector 61 need not be a plane mirror but may be spherical, cylindrical or of other curvature.

Figure 16:
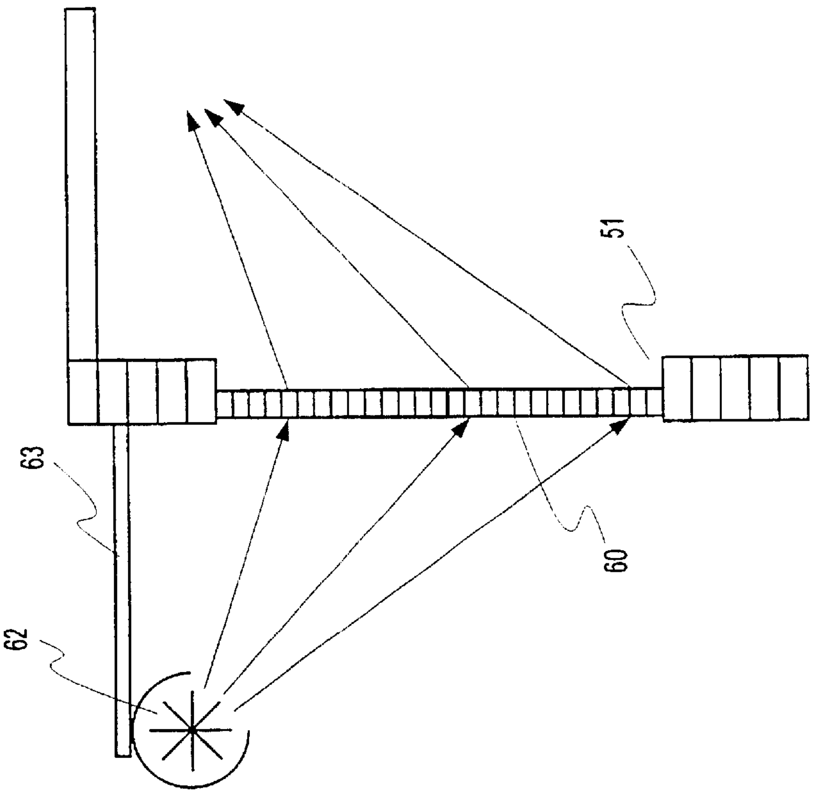
FIG. 16 is a schematic cross-sectional view illustrating the use of an optical component of the present invention with an artificial light source.

In FIG. 16 there is shown a system in which an optical component 60 glazing an open 51 is provided with an artificial light source 62 carried on a bracket 63 outside and above the window opening 51. By focussing the light from the light source 62 on the optical component 60 it can be ensured that all its light energy is delivered into the interior of the room. The light distribution characteristics of the optical component allow artificial lighting to be applied where it is needed in a way that simulate daylight even though the source 62 is an artificial source. If the source has the right colour temperature characteristics the occupants of the room may not realise that artificial light is being used to boots daylight. This configuration has the advantage that the heat generated by a highly powerful light source, such as a high intensity discharge lamp or a microwave driven sulphur lamp is not delivered to the interior of the building which may be air conditioned. This provides a considerable economic benefit since the dissipation of the heat involved in light generation outside the air conditioned zone avoids unnecessary costs.

Figure 17:
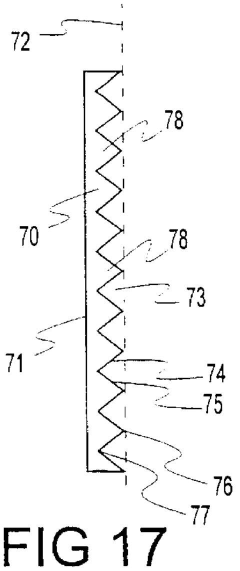
FIG. 17 is a cross-sectional view of an optically transparent body suitable for use in forming an optical component constituting a further embodiment of the present invention
Figure 18:
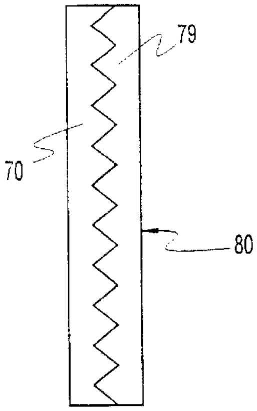
FIG. 18 is a schematic view of an assembled component utilising the transparent body of FIG. 17.
Figure 19:
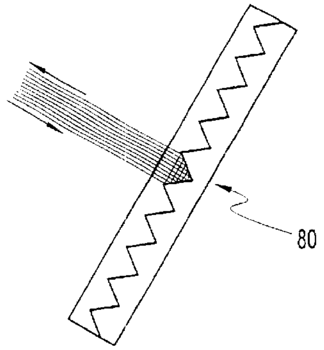
FIG. 19 is a schematic diagram illustrating the ray paths of light incident on the optical component of FIG. 18 in certain limited directions.
Figure 20A:
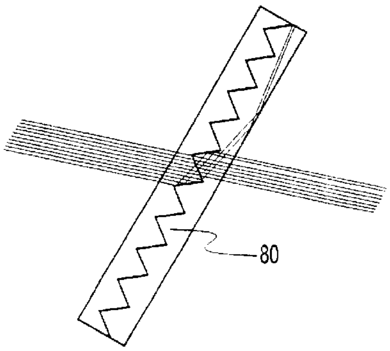
FIGS. 20*a*, 20*b*, 20*c* and 20*d* are similar schematic views illustrating the behaviour of light incident at a range of different angles from that of FIG. 19.
Figure 20B:
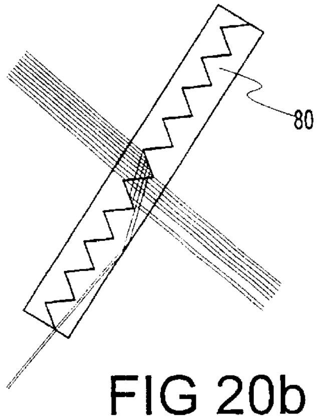
Figure 20C:
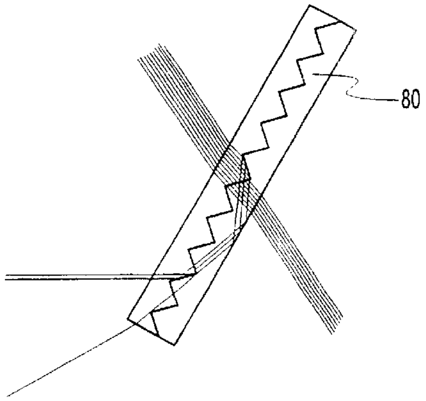
Figure 20D:
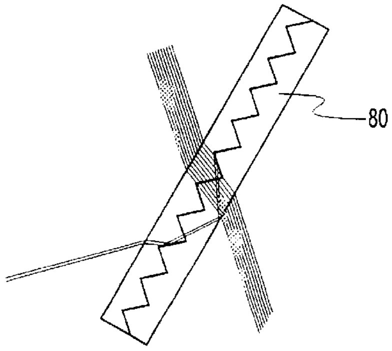

FIGS. 17 to 19 illustrate an alternative embodiment of the optical component of the present invention which is designed specifically to cause catadioptric reflection of light arriving close to the normal to the plane of the element. The profile of an appropriate transparent body 70 is shown in FIG. 17. This, like the embodiments of previous figures, comprises a substantially flat panel with a major surface 71 in the form of a flat uninterrupted plane, an opposite major face represented by the broken line 72 which is interrupted by a plurality of parallel grooves 73 each defined by two flat inclined surfaces 74, 75 which meet at a point (in the cross-section) at their crest 76 and at a corresponding point 77 at the bottom or trough of the groove 73. Adjacent grooves 73 are separated by ribs 78 defining cavity separators.

An optical component is formed by placing two bodies 70 in face-to-face relationship with the faces 72 directed towards one another and the cavities 73 and cavity separators 78 interpenetrating as shown in FIG. 18. In this embodiment, however, contacting faces do not mate closely to form an interface as in previous embodiments, but are held spaced from one another so that there is a sinuous air gap throughout the entirety of the component. Both inclined faces 74, 75 thus act as reflecting interfaces for light arriving through the body 70 from the major face 71 and, because these faces are inclined at substantially 90° to one another, light incident close to the normal to the plane of the incident face 71 is reflected through 90° at the first interface encountered, for example the interface defined by the inclined surface 74 of the cavity 73, and again at 90° when incident on the surface 75 so that the incident light is reflected through 180° and back out from the optical component 80. This condition is met for light incident at small angles from the truly perpendicular, over a range from 5 to 7° as shown in FIG. 19. This optical component is, therefore, ideally suited for use in the array illustrated in FIG. 14 where, by orienting the slats 63 appropriately, light from the sun's disc can be retro-reflected thereby avoiding glare.

FIGS. 20*a*, 20*b*, 20*c* and 20*d* illustrate the behaviour of light incident on the embodiment of FIGS. 17 to 19 at successively greater angles to the normal, namely 15°, 45°, 60° and 75°. It will be seen that the majority of the light passes through the element undeviated although in all cases a small amount is lost by reflection at a first interface which is not picked up at a second interface. Blinds formed as an array of slats with a structure such as that described in relation to FIGS. 17 to 20 have various options which may be included individually or collectively. For example, curvature of the slat and/or variation of geometry between elements within the slat achieves progressive transition between the reflective and transmissive modes of operation of the slat. Moreover the grooves in the material may run horizontally or vertically to produce either a horizontal or vertical 'blackout bar' when viewing out from inside the room. Preferably, the major axis of the slat, about which adjustment is normally made, runs parallel to the groove direction. The choice of groove direction, slat orientation (i.e. horizontal or vertical blind) and adjustment axis can have implications for how often the blind needs to be adjusted to maintain sun shading within the room, and the type of drive means required to do this automatically.

As will be appreciated, the refractive index of the material determines the width of the 'blackout bar' and hence how often the blind needs to be adjusted. A larger index produces a wider bar. As an alternative to sun shading, the blind offers a directional privacy function. For example, the adjustment position of FIG. 18 would prevent exchange of views through windows at the same level across a street.

Figure 21:
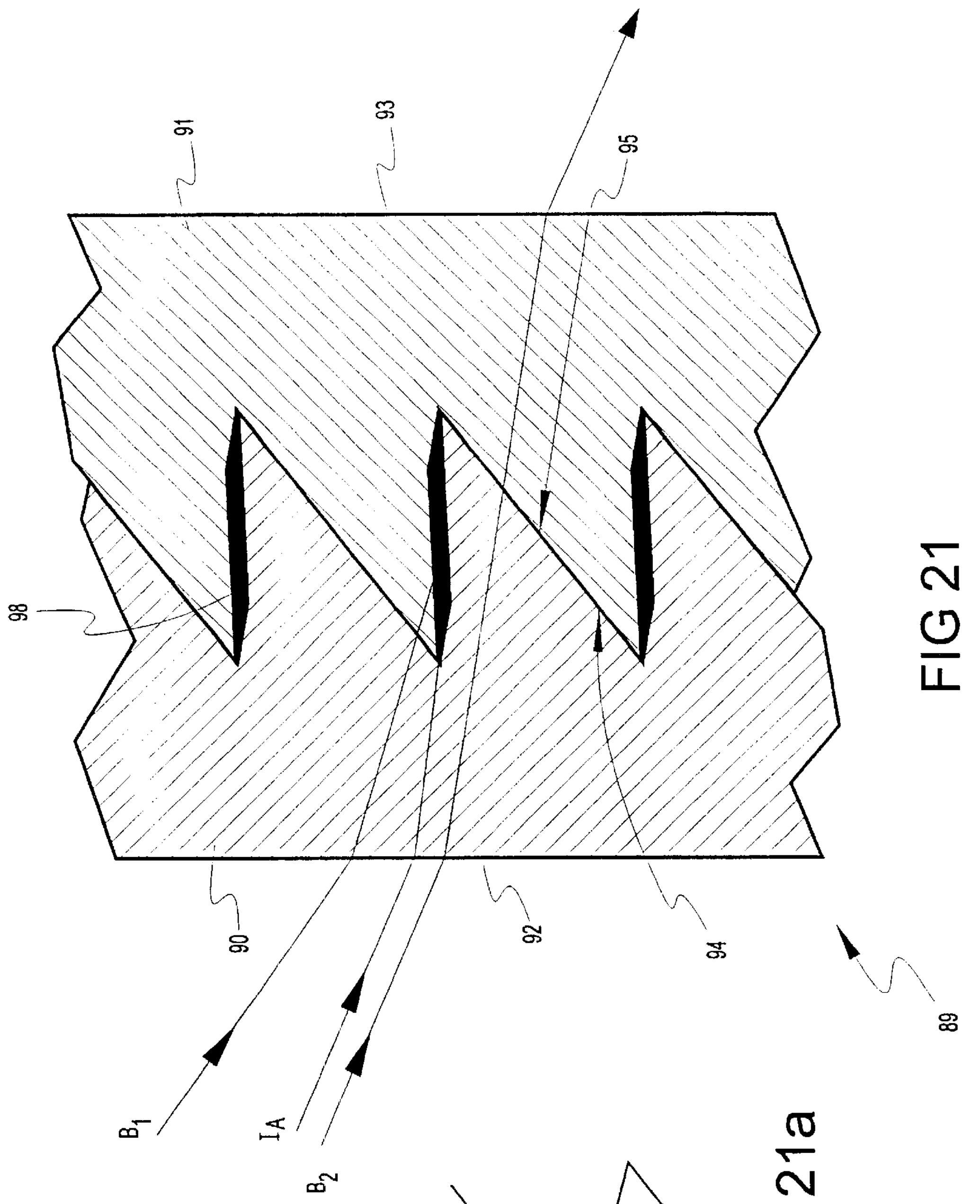
FIG. 21 is a partial sectional view, on an enlarged scale, of a further alternative embodiment of the invention.
Figure 21A:
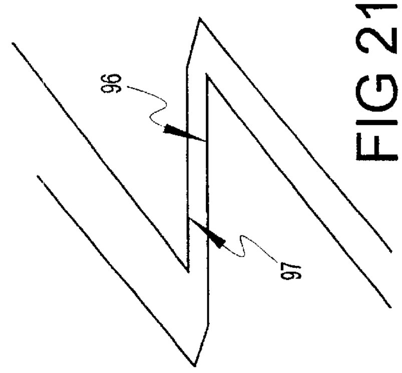

FIG. 21 illustrates an embodiment of the invention similar to that of FIGS. 7 and 8. In the FIG. 21 embodiment, however, the voids between adjacent non-contacting elementary surfaces are filled with an opaque adhesive. In more detail, FIG. 21 shows an optical component 89 comprising two optically transparent bodies 90, 91 having respective substantially planar uninterrupted major surfaces 92, 93 and opposite major faces interrupted by a plurality of cavities defined by inclined elementary surfaces 95, 96 (in the case of the body 90) and 94, 97 (in the case of the body 91). FIG. 21*a* is an enlarged view showing a part of the embodiment of FIG. 21 with the components separated so that the elementary surfaces can be more readily identified.

When the two bodies 90, 91 are brought together, the interrupted surfaces are coated in an opaque adhesive and the two bodies 90, 91 are pressed together under substantial pressure such that the inclined surfaces 94, 95 come into close contact with one another, all the adhesive between them being squeezed out into voids defined between facing orthogonal elementary surfaces 96, 97 to form opaque elements 98 in a shutter-like array as illustrated in FIG. 21. The opaque elements 98 in the embodiment of FIG. 21 are substantially orthogonal to the major uninterrupted surfaces 92, 93 although, in other embodiments, they could be inclined at a different angle to these major surfaces by suitable selection of the angles of the elementary surfaces 96, 97 when the cavities are formed.

In use the embodiment of FIG. 21 acts to allow light close to the normal to the major surfaces 90, 93, and inclined thereto up to a certain threshold angle, to pass through substantially undeviated as illustrated by ray B2. Light incident at a higher angle of incidence, as illustrated by ray B1, however, is absorbed when it reaches the opaque elements 98. It will be appreciated, in consideration of FIG. 21, that the dimensions have been exaggerated for the purpose of clarity, and that the ratio between the depth and width of the cavities defined by the elementary surfaces 94, 95, 96, 97 may be such as to provide a greater limitation on the angle of incident light transmitted through the component than is apparent from the dimensions used for illustrative purposes only in FIG. 21.

Embodiments such as that of FIG. 21 may be used in optical components used for covering light sources or instruments where a degree of privacy or freedom from reflection is required. It will be appreciated that in the case of instrument covers, the orientation of the cavities, in this embodiment formed as elongate strips, in a vertical or substantially vertical direction will allow an observer directly in front of the instrument to view it without impediment whereas observers to either side will receive no transmitted light and therefore will be unable to read the instrument. Moreover, an observer located on the side of the component facing major surface 93 will not suffer from unwanted reflections from bright objects to either side (which reflections would occur by total internal reflection at the "rear" major face 92) because of the absorbing effect of the opaque elements 98 for light other than at a narrow angle of incidence. Reflection at surface 92 by the TIR effect only takes place when the angle of incidence is greater than a critical threshold angle; the dimensions and spacing of the opaque elements 98 can be chosen such that light above the critical angle would not be transmitted. A minor amount of front surface reflection from the surface 93 will, of course, still occur but this may be minimised by suitable coatings and is a second order effect having much less significance than the rear face reflection. By orientating the grooves horizontally it is possible to avoid the need for a hood over an instrument or light source and such an embodiment may, for example, be used to allow greater freedom in design of instrument panels which, with its use, will not require to be recessed, sunk or hooded to the same extent as is currently necessary in order to ensure freedom from unwanted reflections and/or glare.

Figure 23:
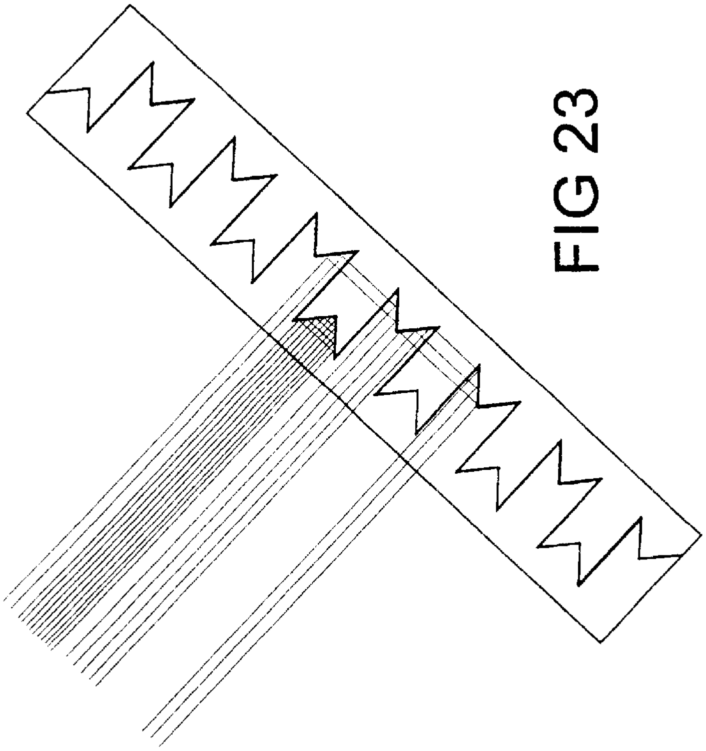
FIG. 23 is a schematic sectional view of the embodiment of FIG. 22 shown in a second configuration of use.
Figure 22:
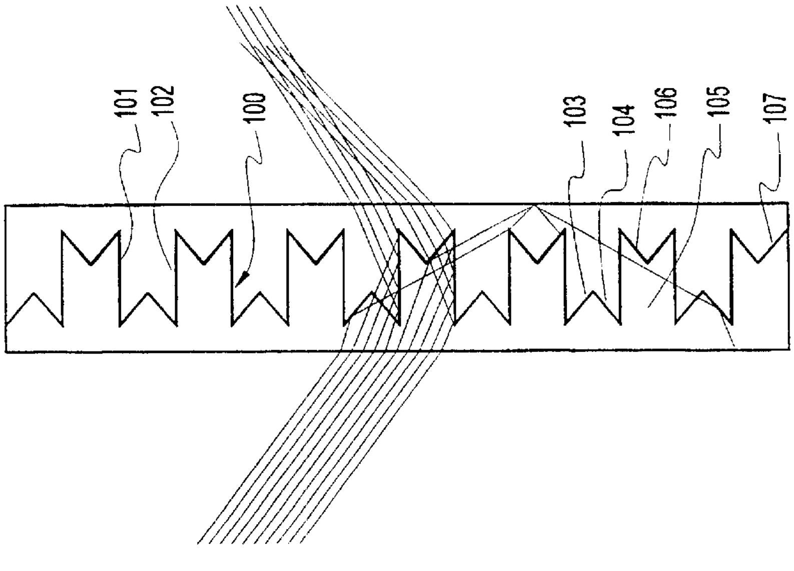
FIG. 22 is a schematic sectional view of a further alternative embodiment of the invention shown in a first configuration of use.

FIGS. 22 and 23 show a blind slat combining a special geometric form with the features of the retroreflecting blind slat of FIG. 19 to form a blind slat that combines sun shading with improved daylighting, though not necessarily at the same time. In these figures the form of the boches from which the slats are formed is similar to that of FIGS. 17 to 20 but instead of V-shape corrugations defining the grooves and groove separators, the facing surfaces of the bodies have grooves 100 having two major side faces 101, 102 and the bottom wall has a re-entrant shape defined by two bottom wall surfaces 103, 104. The crests of the cavity separators 105 are likewise defined by two inclined surfaces 106, 107.

Typically, if the sun is not shining on a window, the room occupant will benefit from the daylighting function (FIG. 22) whilst if it is shining on the window the shading function will be preferred, which can be achieved simply by inclining slats, for example as shown in FIG. 23.

It will be understood that in this embodiment the view through the slat will be explained but, of course, with such a system the view through the slat will be impaired but of course, with such a system the view can be obtained, if desired, by adjusting the slats to the edge-on configuration in which they offer the minimum disturbance to the view.

What is claimed is:

1. An optical component of the type comprising two optically transparent bodies each having two major faces one of which is interrupted by a plurality of cavities defined by spaced apart opposing walls with inclined bottom surfaces and separated by cavity separators, in which the cavity separators between the cavities of one optically transparent body penetrate into the cavities of the other body and define for each cavity at least two voids between facing surfaces and in which said inclined surfaces of said cavity and cavity separator, respectively, come into contact with one another when said two optically transparent bodies are pressed fully together, such that said contact between said inclined surfaces of said bodies locks said bodies together in a predetermined position with respect to each other against movement in a direction parallel to the two major faces of said bodies, wherein a plane of each of said inclined surfaces intersects a plane of each of said opposing walls at an angle respectively.

2. An optical component as claimed in claim 1, in which at least two surfaces of a cavity are substantially parallel to one another and the distance between two such parallel surfaces across a cavity separator is less than the corresponding distance across a cavity to allow interpenetration of cavity separators and cavities.

3. An optical component as claimed in claim 1, in which the surfaces defining a given cavity are inclined with respect to a normal to the major faces of the component.

4. An optical component as claimed in claim 1, in which the surfaces delimiting each cavity define both side walls and bottom walls of the cavity and the surfaces into which the said at least one major face is separated by the cavities have a form and inclination matching that of the said bottom walls whereby to contact one another when the two bodies are placed together with their cavities and cavity separators interpenetrating.

5. An optical component as claimed in claim 1, in which the profile shapes of the two bodies are identical.

6. An optical component as claimed in claim 1, in which the cavities are in the form of elongate grooves and the cavity separators are in the form of ribs.

7. An optical component as claimed in claim 1, in which the surfaces defining the side and/or bottom walls of a cavity act to reduce or eliminate the incidence of light approaching at certain angles.

8. An optical component as claimed in claim 7, in which the shape of the side and/or bottom walls of a cavity is such that the voids formed between them upon interpenetration of the two bodies taper to a point or a line in cross section.

9. An optical component as claimed in claim 7, in which at least part of at least some of the side and/or bottom walls of a cavity are surface treated and/or coated whereby to inhibit the transmission of light through the component from a limited range of incident angles.

10. An optical component as claimed in claim 1, in which at least some of the surface elements defining the side and/or bottom walls of the cavities contact one another when the bodies are positioned to interpenetrate one another, there further being provided transparent or translucent interstitial material having a refractive index not less than that of the body on the incident side of the interface thus defined and not greater that that of the body on the exit side of the interface.

11. An optical component as claimed in claim 1, in which the two optically transparent bodies have different refractive indices.

12. An optical component as claimed in claim 10, in which the transparent or translucent interstitial material is an adhesive.

13. An optical component as claimed in claim 1 formed as a sun shade or barrier to prevent the transmission of light through the component from certain incident angles or ranges of angles by a combination of the choice of orientation angle of an interface and refractive index of interstitial material between the surfaces defining the interface whereby to determine the angle of incidence at which there is a transition from refraction through the interface to reflection therefrom.

14. An optical component as claimed in claim 1, in which the angle of inclination of those surface elements at the bodies which define interfaces at which reflection takes place lie at an angle to the normal to the major faces of the bodies which does not exceed 7°.

15. An optical component as claimed in claim 14, in which the said angle does not exceed 5°.

16. An optical component as claimed in claim 1, in which the surface elements are configured to allow use of the component as a mirror.

17. An optical assembly including optical components as claimed in claim 1, in which the transparent bodies are sufficiently rigid as to be self-supporting or are carried on a or a respective transparent or translucent support, the bodies and/or supports being elongate and held in an array substantially parallel to one another.

18. An optical assembly as claimed in claim 17, in which the elongate bodies or supports are oriented with their longer axes generally horizontal.

19. An optical assembly as claimed in claim 17, in which the elongate bodies or supports are oriented with their longer axes generally vertical.

20. An optical assembly as claimed in claim 17, in which the elongate bodies or supports are oriented with their axes parallel to one another and inclined to the horizontal.

21. An optical assembly as claimed in claim 17, in which the cavities are in the form of parallel rectilinear grooves oriented parallel to the long axis of each body.

22. An optical assembly as claimed in claim 17, in which the cavities are in the form of parallel rectilinear grooves oriented transversely of the long axis of each body.

23. An optical assembly as claimed in claim 17, in which the bodies or the supports are adjustable in inclination individually or collectively about their respective longer axes.

24. An optical assembly as claimed in claim 17, in which there are further provided means for automatically adjusting the inclination of the bodies or the supports about their respective long axes in dependence on a signal from a light sensor representing the incident direction of the major part of the incident light.

25. An optical assembly as claimed in claim 17, in which the array of elongate bodies and/or supports is a substantially planar array pivotally mounted or movable outside an opening in a building or the like in such a way that the array can turn as a whole about a pivot axis.

26. An optical assembly as claimed in claim 17, in which the array of elongate bodies and/or supports is a substantially planar array mounted or mountable outside an opening in a building or the like with the plane of the array inclined with respect to the plane of the opening whereby to intercept light travelling downwardly past the opening, the reflecting interfaces being oriented in such as way as to divert this downwardly directed light through the opening.

27. An optical assembly comprising an optical component as claimed in claim 1, in the form of a panel and having means for supporting the panel over the outside of a window or other openings in a building or the like with its plane inclined to the vertical whereby to divert into the opening light arriving downwardly in such a direction as to pass the opening.

28. An optical assembly as claimed in claim 27, in which the inclination of the panel is adjustable.

29. An optical assembly comprising at least one optical component as claimed in claim 1, in the form of a glazing panel in a window or like opening in a building, and a further light-diverting component within the interior of the building positioned in the path of light diverted by the said optical component and acting to divert the light incident on it.

30. An optical assembly as claimed in claim 29, in which the further light-diverting component is a reflector.

31. An optical assembly as claimed in claim 30, in which the reflector is a plane reflector.

32. An optical assembly as claimed in claim 30, in which the reflector is a curved reflector.

33. An optical assembly for use in glazing and illuminating an opening in a building, comprising an optical component as claimed in claim 1, further including an artificial light source and means for positioning it outside the opening and orienting it to divert light towards the opening such that light emitted by the artificial light source is diverted by the optical component in a predetermined direction.

* * * * *

UNITED STATES PATENT AND TRADEMARK OFFICE

CERTIFICATE OF CORRECTION

PATENT NO. : 6,435,683 B1 
DATED : August 20, 2002
INVENTOR(S) : Peter James Milner It is certified that error appears in the above-identified patent and that said Letters Patent is hereby corrected as shown below:

Title page,
Item [57], ABSTRACT, please delete the ABSTRACT and replace with the following:

ABSTRACT

A OPTICAL COMPONENT FOR DAYLIGHTING AND OTHER PURPOSES

An optical component (11) comprises two transparent flat bodies (12, 13) each having grooves (16) or other surface features on one of its faces (15) which interpenetrate when the two bodies (12, 13) are placed face-to face. The shapes of the grooves (16) or other surfaces features are such that they touch in some places (20, 22, 23) and are spaced from one another in others (18, 19) to form voids (24) within the composite body (11) so formed. These cavities (24) assist in determining total internal reflection of incident light at certain angles. Composites bodies formed from two face-to face optical components may be used as daylighting screens both to direct light towards an object such as the interior of a building (through an opening) or to screen light from it by diverting it away therefrom.

Column 3,
Line 32, please delete "where by" and insert -- whereby --;
Line 33, please delete "inter penetration" and insert -- interpenetration --;

Column 4,
Line 6, please delete "bet ween" and insert -- between --;
Line 20, please delete "another,in" and insert -- another. In --;
Line 37, please delete "materials" and insert -- material, --;

Column 5,
Line 21, please delete "or a";

Column 7,
Lines 6 and 7, please delete "present/invention" and insert -- present invention --;

UNITED STATES PATENT AND TRADEMARK OFFICE

CERTIFICATE OF CORRECTION

PATENT NO. : 6,435,683 B1 
DATED : August 20, 2002
INVENTOR(S) : Peter James Milner It is certified that error appears in the above-identified patent and that said Letters Patent is hereby corrected as shown below:

Column 8,
Line 2, please delete "optic" and insert -- optical --;
Line 5, please delete "o" and insert -- of --;
Line 29, please delete "blind" and insert -- blind; --;

Column 9,
Line 6, please delete "an" and insert -- and --;

Column 10,
Line 11, in the instance of "I1, I2", the "1" and "2" should be in subscript;

Column 12,
Line 22, please delete "a" and insert -- or --;

Column 13,
Line 56, please delete "from";
Line 61, please delete "open" and insert -- opening --;

Column 14,
Line 5, please delete "boots" and insert -- boost --;

Column 17,
Line 64, please delete "on a or a" and insert -- on/or a --;

Column 18,
Line 36, please delete "as way" and insert -- a way --.

Signed and Sealed this

Sixth Day of September, 2005

JON W. DUDAS
*Director of the United States Patent and Trademark Office*